(12) United States Patent
Hong et al.

(10) Patent No.: US 10,240,219 B2
(45) Date of Patent: Mar. 26, 2019

(54) HIGH FREQUENCY HEAT TREATMENT METHOD OF ULTRA-HIGH STRENGTH PARTS

(71) Applicant: Hyundai Motor Company, Seoul (KR)

(72) Inventors: Seung-Hyun Hong, Gyeonggi-Do (KR); Ji-Hong Yoo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 25 days.

(21) Appl. No.: 13/715,695

(22) Filed: Dec. 14, 2012

(65) Prior Publication Data

US 2018/0080097 A1    Mar. 22, 2018

(30) Foreign Application Priority Data

May 25, 2012  (KR) .............. 10-2012-55833

(51) Int. Cl.
*C21D 6/00* (2006.01)
*C21D 7/13* (2006.01)
(Continued)

(52) U.S. Cl.
CPC .............. *C21D 6/008* (2013.01); *C21D 1/19* (2013.01); *C21D 1/42* (2013.01); *C21D 1/673* (2013.01);
(Continued)

(58) Field of Classification Search
CPC .......... C21D 6/008; C21D 1/42; C21D 6/005; C21D 2211/009; C21D 2211/005; C22C 38/02; C22C 38/04; C22C 38/002
See application file for complete search history.

(56) References Cited

U.S. PATENT DOCUMENTS

2011/0016719 A1*  1/2011  Lee .................. C21D 1/42
                                                29/897.2

FOREIGN PATENT DOCUMENTS

| DE | 69621866 T2 | 2/2003 |
| JP | 56-123328 A | 9/1981 |

(Continued)

OTHER PUBLICATIONS

Barcellona, A., & Palmeri, D. (2009). Effect of plastic hot deformation on the hardness and continuous cooling transformations of 22MnB5 microalloyed boron steel. Metallurgical and Materials Transactions A, 40(5), 1160-1174. (Year: 2009).*

(Continued)

*Primary Examiner* — Jessee R Roe
*Assistant Examiner* — Jophy S. Koshy
(74) *Attorney, Agent, or Firm* — Mintz Levin Cohn Ferris Glovsky and Popeo, P.C.; Peter F. Corless

(57) ABSTRACT

Disclosed is a high frequency heat treatment method of hot-stamping-treated ultra-high strength parts, which comprises: a first step of heating the parts until the temperature of a heat treatment zone thereof becomes the AC3 transformation point or higher; a second step of maintaining the temperature until phase transformation of the heat treatment zone to austenite is completed; and a third step of cooling the heat treatment zone to transform the structure thereof to ferrite-pearlite. The present method improves the energy absorbing efficiency by increasing the parts' elongation ratio by locally forming a softening structure which absorbs energy.

4 Claims, 4 Drawing Sheets

(51) Int. Cl.
C21D 1/19 (2006.01)
C21D 1/42 (2006.01)
C21D 1/673 (2006.01)
C22C 1/02 (2006.01)
C22C 38/00 (2006.01)
C22C 38/02 (2006.01)
C22C 38/04 (2006.01)

(52) U.S. Cl.
CPC ............... *C21D 6/005* (2013.01); *C21D 7/13* (2013.01); *C22C 1/02* (2013.01); *C22C 38/002* (2013.01); *C22C 38/02* (2013.01); *C22C 38/04* (2013.01); *C21D 2211/001* (2013.01); *C21D 2211/005* (2013.01); *C21D 2211/009* (2013.01); *C21D 2221/00* (2013.01); *Y02P 10/253* (2015.11)

(56) References Cited

FOREIGN PATENT DOCUMENTS

| | | |
|---|---|---|
| JP | 05-065541 A | 3/1993 |
| JP | 2011-025900 A | 2/2011 |
| JP | 2012-041613 A | 3/2012 |
| KR | 10-0761730 B1 | 9/2007 |
| KR | 10-2011-0062428 A | 6/2011 |

OTHER PUBLICATIONS

Dossett, Jon L. Totten, George E.. (2014). ASM Handbook, vol. 04D—Heat Treating of Irons and Steels—11.2 Heat Treatment of Boron Steel. ASM International. (Year: 2014).*

* cited by examiner

[FIG. 1]
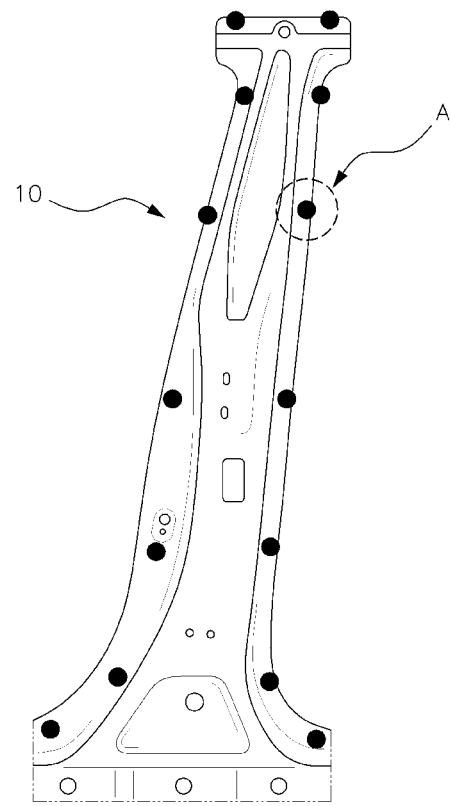

[FIG. 2]
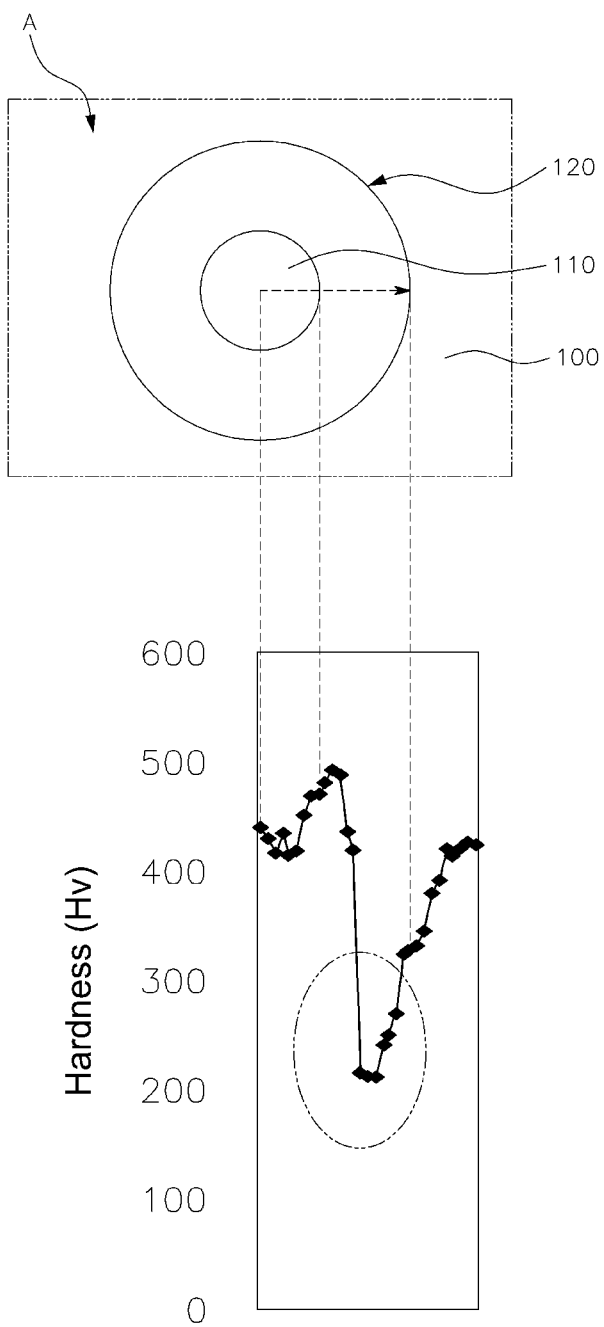

[FIG. 3]
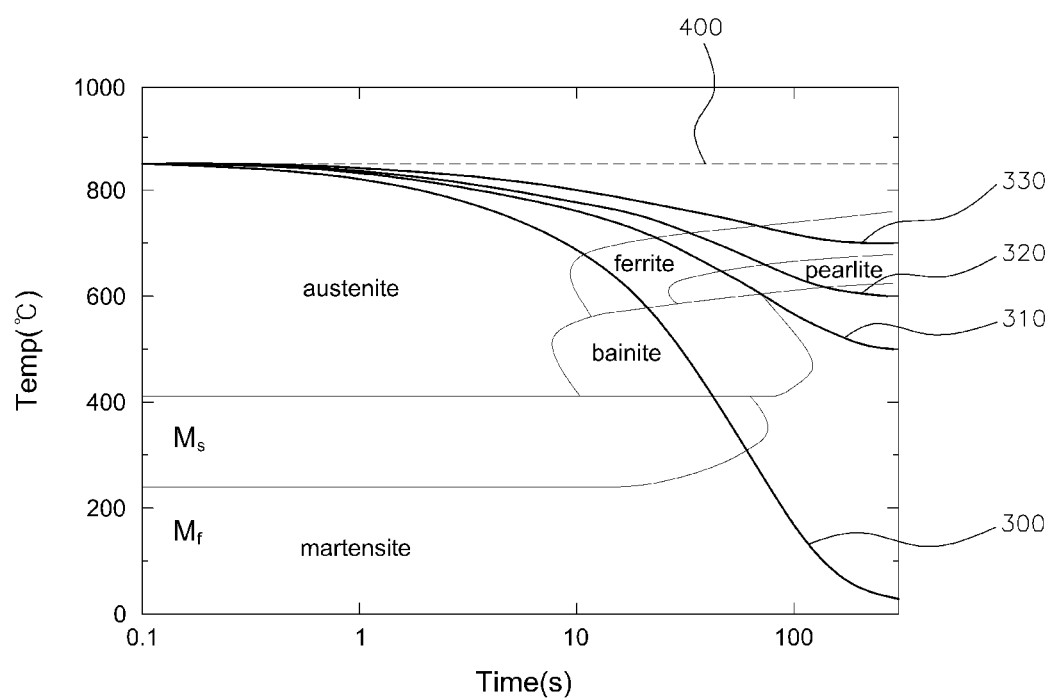

[FIG. 4]
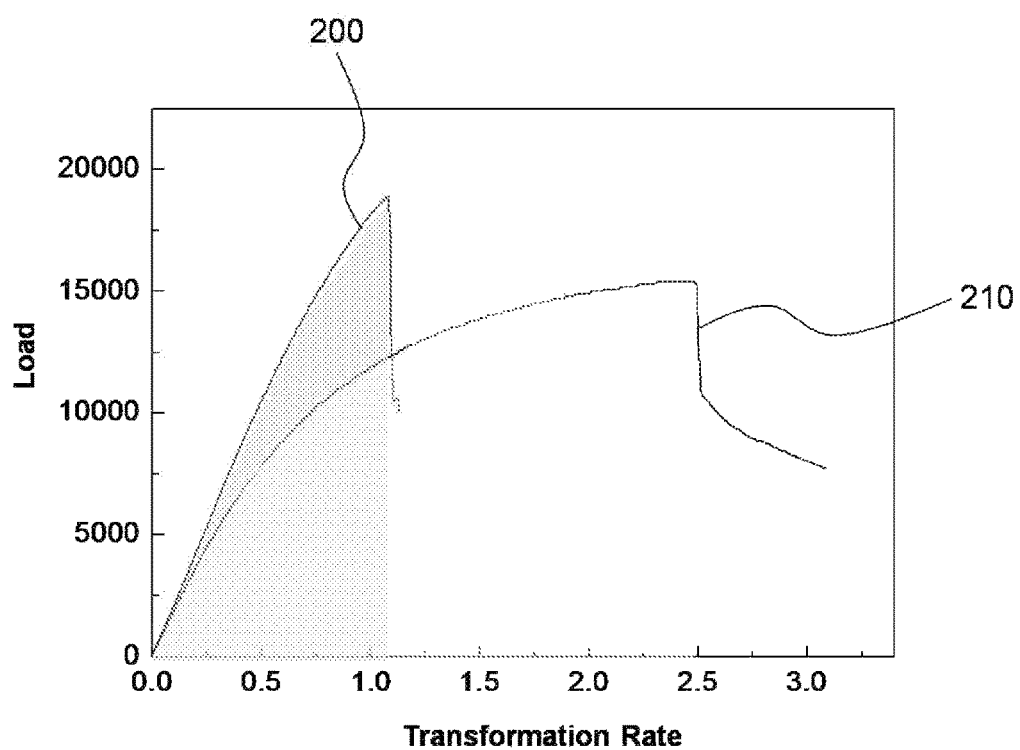

HIGH FREQUENCY HEAT TREATMENT METHOD OF ULTRA-HIGH STRENGTH PARTS

CROSS-REFERENCE TO RELATED APPLICATIONS

This application claims priority under 35 U.S.C. § 119 to Korean Patent Application No. 10-2012-55833, filed on May 25, 2012, in the Korean Intellectual Property Office, the disclosure of which is incorporated herein by reference in its entirety

BACKGROUND OF THE INVENTION

1. Field of the Invention

The present invention relates to a method for high frequency heat treatment of ultra-high strength parts, and more particularly, to a heat treatment method that improves energy absorbing efficiency by locally conducting high frequency heat treatment to a heat treatment zone of the part in a hot-stamping process for forming the ultra-high strength parts.

2. Description of the Related Art

Areas of heavy interest in the development of vehicles include improvements in crash stability, making the vehicles more lightweight, and reducing costs. In particularly, many safety mechanisms for reducing the degree of injury to passengers during broadside collisions, such as safety belts, air bags and the like, have been further regulated since 2000.

However, when broadside collision accidents occur, injury is generally caused by vehicle body deformation. Thus, the above-noted safety mechanisms do not provide a fundamental solution.

Accordingly, various attempts have been made to minimize vehicle body deformation, and recent studies have been focused on the potential application of an ultra-high strength steel to vehicles. As a result, 1500 MPa-grade ultra-high strength parts, formed using a high temperature molding called hot-stamping, have been manufactured.

Conventionally, a hot-stamping process comprise a blanking process, a heating process, a transfer process, a pressing process and a rapid cooling process. Specifically, a part is blanked to the size needed, and the blank is heated to AC3 temperature or more in a heating furnace. Then, the heated blank is molded and cooled in a press using a transfer robot. At this time, cooling is enabled by absorbing the heat transferred from the blank through a cooling channel in a mold. The pressed and cooled materials become parts having 1500 MPa-grade ultra-high strength, which can be used for main crash parts of vehicles.

However, hot-stamping-treated ultra-high strength parts, which are commonly used for vehicles, comprise carbon (C) 0.15 to 0.30% by weight, silicon (Si) 0.05 to 0.5% by weight, manganese (Mn) 1.0 to 2.0% by weight, boron (B) 0.0005 to 0.0040% by weight, sulfur (S) more than 0% to 0.003 or less % by weight, phosphorus (P) more than 0% to 0.012 or less % by weight, a balance of iron (Fe) and inevitable impurities.

These ultra-high strength parts are mostly assembled by spot welding, which is a welding method of attaching two parts by resistance heating generated at a contact point, where electric current is concentrated when the parts are placed under pressure and electrically conducted with an electrode tip. This method is broadly used in as much as about 95% of total welding elements, which number about 4000 to 7000 per a car.

Thus, while the hot-stamping-treated parts have an advantage of high strength, there is a problem in that the ultra-high strength parts are fractured without plastic deformation when external force is applied because a tendency for brittle fracture generally increases with increasing material strength.

Specifically, when impact is applied to the parts in welding zone having 440 Mpa-grade strength before the hot-stamping treatment, plug fracture is observed as energy is absorbed while the process progresses to a base metal zone. This occurs even though a crack is generated at the welding zone of the parts. On the other hand, when impact is applied to the welding zone of the hot-stamping-treated ultra-high strength parts, button fracture or interfacial fracture is directly observed at a Heat Affected Zone (HAZ) or a beading unit of the parts welding zone.

Namely, plug fracture refers to separation and cutting of the welding zone together with a portion of one side of the parts. Energy is absorbed as the process progresses to the base metal zone even though a crack is formed. On the other hand, a button fracture or interfacial fracture is generated due to insufficient energy absorption (unlike the plug fracture) because a nugget or an attaching point of the welding zone is directly cut.

Further, because the welding zone of the ultra-high strength parts has a lower energy absorbing efficiency than the parts welding zone before the hot-stamping treatment, there is a problem in that a structural adhesive for complementing welding strength is generally applied to a flange of the hot-stamping-treated parts in addition to welding in order to improve the efficiency.

The description provided above as a related art of the present invention is just for helping understanding the background of the present invention and should not be construed as being included in the related art known by those skilled in the art.

SUMMARY OF THE INVENTION

The present invention provides a heat treatment method for locally conducting high frequency heat treatment in a heat treatment zone of a hot-stamping process which forms ultra-high strength parts. The present method improves a subsequent welding strength of the parts without requiring the use of a structural adhesive. According to one aspect, the present invention provides a high frequency heat treatment method of ultra-high strength parts comprising: a first step of heating the hot-stamping-treated ultra-high strength parts until the temperature of a heat treatment zone of the parts becomes the AC3 transformation point or higher; a second step of maintaining the temperature until the structure of the heat treatment zone is phase transformed to the austenite phase; and a third step of cooling the heat treatment zone to transform to the ferrite-pearlite phase.

According to an exemplary embodiment, the hot-stamping-treated ultra-high strength parts comprises: carbon (C) about 0.15 to 0.30% by weight, silicon (Si) about 0.05 to 0.5% by weight, manganese (Mn) about 1.0 to 2.0% by weight, boron (B) about 0.0005 to 0.0040% by weight, sulfur (S) more than about 0% and no greater than about 0.003% by weight, phosphorus (P) more than about 0% and no greater than about 0.012% by weight, a balance of iron (Fe), and inevitable impurities.

According to an exemplary embodiment, the first step comprises heating hot-stamping-treated ultra-high strength parts until the temperature of the heat treatment zone is about 850 to 1000° C.

According to an exemplary embodiment, the second step comprises, when the temperature of the heated heat treatment zone is about 850° C., maintaining the temperature for about 30 seconds or more until phase transformation of the heat treatment zone to austenite is completed.

According to an exemplary embodiment, the second step comprises, when the temperature of the heated heat treatment zone is about 1000° C., maintaining the temperature for about 10 seconds or more until phase transformation of the heat treatment zone to austenite is completed.

According to an exemplary embodiment, the third step comprises holding the temperature at about 550 to 700° C. for about 80 seconds or more until the heat treatment zone becomes ferrite-pearlite.

According to an exemplary embodiment, the third step is carried out so that the cooling rate is about 5° C./second or less.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 1 is a drawing showing a hot-stamping-treated ultra-high strength part according to an embodiment of the present invention.

FIG. 2 is an enlarged drawing of the portion A of FIG. 1 showing hardness of the heat treatment zone after conducting the high frequency heat treatment according to an embodiment of the present invention.

FIG. 3 is a drawing showing phase transformation according to the heat treatment time and the heat treatment temperature of the high strength parts an embodiment of the present invention.

FIG. 4 is a drawing comparing the results of (1) a tensile-shear test of a spot welding zone after conducting the high frequency heat treatment of the heat treatment zone according to Example 1 with (2) the results of the test carried out on a conventional part, followed by vehicle assembly.

DESCRIPTION OF SYMBOLS

10: Ultra-high Strength Parts
100: Flange
110: Spot Welding Zone
120: Heat Treatment Zone
200: Results of Tensile-Shear Test of Spot Welding Zone according to Example 1
210: Results of Tensile-Shear Test of Spot Welding Zone of a conventional part
300: 10° C./s Cooling Rate
310: 5° C./s Cooling Rate
320: 4° C./s Cooling Rate
330: 2° C./s Cooling Rate
400: AC3 Transformation Point It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter the present invention will be described in detail with reference to the accompanying drawings and described below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

FIG. 1 is a drawing showing a hot-stamping-treated ultra-high strength part according to an embodiment of the present invention, and FIG. 2 is an enlarged drawing of the portion A of FIG. 1 showing hardness of the heat treatment zone after conducting the high frequency heat treatment according to the present invention.

According to the following exemplary embodiment of the present invention, the hot-stamping-treated ultra-high strength parts 10 generally comprises: carbon (C) about 0.15 to 0.30% by weight, silicon (Si) about 0.05 to 0.5% by weight, manganese (Mn) about 1.0 to 2.0% by weight, boron (B) about 0.0005 to 0.0040% by weight, sulfur (S) more than about 0% and no greater than about 0.003% by weight, phosphorus (P) more than 0% and no greater than about 0.012% by weight, a balance of iron (Fe), and inevitable impurities.

Generally, the hot-stamping-treated ultra-high strength parts 10 are assembled by spot welding. When impact is applied from outside to the spot welding zone 110, there is a problem in that button fracture, interfacial fracture and the like are generated, which are not generated at a welding zone of the parts before the hot-stamping treatment. In particular, in the case of button fracture or interfacial fracture, the parts' welding zone can't absorb impact energy on its own unlike plug fracture which is generated at the parts' welding zone before the hot-stamping treatment. Thus, it is possible that a crack can be formed in the entire part as the fractured welding zone acts as a crack starting point.

Accordingly, the present method overcomes this problem, by conducting high frequency heat treatment of the heat treatment zone 120 of a flange 100 used for assembling the parts as illustrated in the FIG. 2 embodiment.

According to an embodiment, the high frequency heat treatment is a heat treatment process in which the surface of a metal part is heated with a heat source of high frequency induction heating. The heat treatment zone 120 is a zone subject to the high frequency heat treatment which can further comprises the spot welding zone 110 for convenience of the heat treatment process and for forming a softened structure for energy absorption.

According to an embodiment of the present invention, in order to confirm whether the softening structure absorbs impact energy, Vickers Hardness was measured from the center of the heat treatment zone 120 to the circumference thereof.

As shown in FIG. 1, the hardness measured from the center of the spot welding zone 110 to the heat treatment zone 120 (at the outer circumference of the spot welding zone 110) was about 400 to 500 Hv, and the hardness measured from the outer circumference of the spot welding zone 110 to the outer circumference of the heat treatment zone 120 was about 200 to 500 Hv. Based on these results, it was confirmed that a softening structure, which has hardness of about 200 to 300 Hv and can absorb impact energy, was formed.

Hereinafter, an exemplary embodiment of the high frequency heat treatment method of the hot-stamping-treated ultra-high strength parts 10 according to the present invention will be described in detail.

Generally, the hot-stamping-treated ultra-high strength parts 10 used for vehicle parts comprise: carbon (C) about 0.15 to 0.30% by weight, silicon (Si) about 0.05 to 0.5% by weight, manganese (Mn) about 1.0 to 2.0% by weight, boron (B) about 0.0005 to 0.0040% by weight, sulfur (S) more than about 0% and no greater than about 0.003% by weight, phosphorus (P) more than about 0% and no greater than about 0.012% by weight, a balance of iron (Fe) and inevitable impurities.

The structure of the ultra-high strength parts 10 is 100% martensite having high hardness and low tenacity resulting from the rapid cooling process of the hot-stamping treatment. However, the structure has a problem of weakness on brittle fracture in spite of the high strength.

Accordingly, a phase transformation to a ferrite-pearlite structure, which is softening structure having elongation ratio of about 25% or more while locally maintaining tensile strength at about 400 to 500 Mpa, is carried out.

TABLE 1

| SABC1470 | Initial Heating Temperature ° C. | Holding Time sec | Reheating Temperature ° C. | Holding Time sec | Yield Strength MPa | Tensile Strength MPa | Elongation Ratio % |
|---|---|---|---|---|---|---|---|
| Before Heat Treatment | | | | | 1205 | 1420 | 6 |
| Exam. 1 | 850 | 30 | 600 | 80 | 380 | 425 | 28 |
| Exam. 2 | 850 | 60 | 550 | 80 | 375 | 418 | 33 |
| Exam. 3 | 850 | 60 | 700 | 90 | 357 | 405 | 34 |
| Exam. 4 | 850 | 90 | 600 | 80 | 370 | 415 | 32 |
| Exam. 5 | 1000 | 10 | 550 | 80 | 400 | 460 | 25 |
| Exam. 6 | 1000 | 30 | 600 | 80 | 382 | 425 | 32 |
| Exam. 7 | 1000 | 60 | 700 | 90 | 380 | 410 | 32 |
| Exam. 8 | 1000 | 90 | 550 | 90 | 381 | 415 | 32 |

Table 1 shows changes in strength and elongation ratio after locally conducting the high frequency heat treatment according to the present invention, particularly in the heat treatment zone 120 of the hot-stamping-treated ultra-high strength parts 10.

As shown, before the heat treatment, yield strength was 1205 MPa, tensile strength was 1420 MPa and elongation ratio was 6%. Therefore, it was confirmed that the parts were weak on brittle fracture due to the low elongation ratio regardless of the ultra-high strength because the structure of the high strength parts 10 formed by the hot-stamping process was 100% martensite.

Accordingly, as in Examples 1-8, the heat treatment zone 120 was heated at 850° C. (the austenite transformation point (AC3)) or higher by the high frequency heat treatment in order to form a ferrite-pearlite structure (Step 1).

It was been found that when the initial heating temperature exceeded 1000° C. and reached the 5 ferrite transformation point, the desired results can't be obtained. Therefore, it is preferred that the initial heating temperature is no greater than 1000° C., which is a suitable temperature below the 5 ferrite transformation point.

Thereafter, the temperature was maintained until the phase transformation to uniform austenite was completed (Step 2).

At this time, the temperature was further preferably maintained at about 850° C. for about 30 seconds or more and then at about 1000° C. for about 10 seconds or more.

Thereafter, the heat treatment zone 120, whose phase transformation to austenite has been completed, was cooled to transform the final structure to a ferrite-pearlite phase (Step 3).

At this time, the ferrite-pearlite structure having a tensile strength of about 400 to 500 MPa and an elongation ratio of about 25% or more was formed by maintaining a reheating temperature at about 550 to 700° C. for about 80 seconds or more, and controlling a cooling rate thereafter at about 5° C./s or less.

TABLE 2

| SABC1470 | Initial Heating Temperature °C. | Holding Time sec | Reheating Temperature °C. | Holding Time sec | Yield Strength MPa | Tensile Strength MPa | Elongation Ratio % |
|---|---|---|---|---|---|---|---|
| Before Heat Treatment | | | | | 1205 | 1420 | 6 |
| Comp. Exam. 1 | 650 | 60 | 550 | 80 | 703 | 719 | 12 |
| Comp. Exam. 2 | 650 | 90 | 700 | 90 | 674 | 699 | 12 |
| Comp. Exam. 3 | 750 | 30 | 550 | 80 | 615 | 632 | 9 |
| Comp. Exam. 4 | 750 | 90 | 600 | 80 | 486 | 520 | 20 |

The method for performing the high frequency heat treatment to the heat treatment zone 120 of the hot-stamping-treated ultra-high strength parts 10 according to the present invention, was carried out at varying reheating temperatures and holding times for controlling the cooling rate (Comparative Examples 1-4 in Table 2). These Examples satisfy the conditions described in Table 1, and demonstrate variations of strength and elongation ratio when the initial heating temperature was lower than the AC3 transformation point, 850° C.

Namely, in order to phase transform the martensite structure of the hot-stamping-treated high strength parts 10 to ferrite-pearlite, the heat treatment zone 120 of the hot-stamping parts must be heated to the AC3 transformation point, 850° C., or higher for phase transformation to austenite.

If the temperature was lower than 850° C. (the AC3 transformation point), then the desired strength and elongation ratio were not obtained, as demonstrated by Comparative Examples 1-4, because the martensite structure of the base metal did not phase transform to the austenite structure.

variations in strength and elongation ratio when the temperature was not maintained at 850° C. for 30 seconds and at 1000° C. for 10 seconds until the phase transformation to uniform austenite was completed.

In order to phase transform the martensite structure of the hot-stamping-treated high strength parts 10 to ferrite-pearlite, the heat treatment zone 120 must be heated at 850° C. (the AC3 transformation point) or higher for phase transformation to austenite. In addition, in order to form a uniform 100% austenite structure, crystals should be fully diffused and redistributed within the structure. As the heating temperature rises, diffusion rate and redistribution rate of the crystals are also increased, thus decreasing the required holding time.

According to embodiments of the invention, the holding time is 30 seconds or more when heating at 850° C., and 10 seconds or more when heating at 1000° C. However, Com-

TABLE 3

| SABC1470 | Initial Heating Temperature °C. | Holding Time sec | Reheating Temperature °C. | Holding Time sec | Yield Strength MPa | Tensile Strength MPa | Elongation Ratio % |
|---|---|---|---|---|---|---|---|
| Before Heat Treatment | | | | | 1205 | 1420 | 6 |
| Comp. Exam. 5 | 850 | 5 | 600 | 80 | 997 | 1160 | 6 |
| Comp. Exam. 6 | 850 | 10 | 550 | 80 | 890 | 1230 | 7 |
| Comp. Exam. 7 | 850 | 5 | 700 | 90 | 978 | 1198 | 7 |
| Comp. Exam. 8 | 850 | 10 | 550 | 90 | 679 | 710 | 12 |
| Comp. Exam. 9 | 1000 | 5 | 550 | 80 | 457 | 510 | 22 |
| Comp. Exam. 10 | 1000 | 5 | 600 | 80 | 1055 | 1260 | 6 |

The method for performing the high frequency heat treatment to the heat treatment zone 120 of the hot-stamping-treated ultra-high strength parts 10 according to the present invention was further carried out while varying the initial heating temperature (Comparative Examples 5-10 in Table 3). These Examples satisfy the condition described in Table 1 as AC3 transformation point, and demonstrated parative Examples 5-10 did not satisfy these conditions. As a result, the desired strengths and elongation ratios were not obtained because the martensite structure of the base metal did not completely phase transform to the austenite structure (i.e., because only a part of phase transformed austenite structure formed a ferrite-pearlite structure) even though the reheating temperature and holding time for controlling the cooling rate satisfied the condition described in Table 1.

TABLE 4

| SABC1470 | Initial Heating Temperature ° C. | Holding Time sec | Reheating Temperature ° C. | Holding Time sec | Yield Strength MPa | Tensile Strength MPa | Elongation Ratio % |
|---|---|---|---|---|---|---|---|
| Before Heat Treatment | | | | | 1205 | 1420 | 6 |
| Comp. Exam. 11 | 850 | 30 | 550 | 70 | 468 | 520 | 21 |
| Comp. Exam. 12 | 850 | 30 | 400 | 80 | 740 | 784 | 9 |
| Comp. Exam. 13 | 1000 | 10 | Air Cooling | — | 770 | 780 | 8 |
| Comp. Exam. 14 | 1000 | 10 | 300 | 80 | 1023 | 1214 | 6 |
| Comp. Exam. 15 | 1000 | 30 | 500 | 80 | 795 | 813 | 9 |
| Comp. Exam. 16 | 1000 | 60 | 550 | 70 | 505 | 546 | 18 |

The method for performing the high frequency heat treatment to the heat treatment zone 120 of the hot-stamping-treated ultra-high strength parts 10 according to the present invention was carried out under varying initial heating temperatures by the high frequency heat treatment that were the AC3 transformation point or higher (Comparative Examples 11-16 in Table 4). As demonstrated, the phase transformation to austenite was completed by maintaining the temperature at 850° C. for 30 seconds or more and at 1000° C. for 10 seconds or more. Further, changes of strength and elongation ratio occurred when cooling of the heat treatment zone 120 to make the final structure ferrite-pearlite was not conducted (i.e., when the cooling rate was not controlled to 5° C./s or less by maintaining the reheating temperature at 550 to 700° C. for 80 seconds or more).

Namely, as shown in FIG. 3, in order to form ferrite-pearlite structure having a strength of 400 to 500 MPa and an elongation ratio of 25% or more at the same time, the initial heating temperature should be AC3 transformation point 400 or more, the temperature should be maintained until the phase transformation to austenite is completed, and then the cooling rate should be controlled to 5° C./s or less (for example, 5° C./s 310, 4° C./s 320, 2° C./s 330 and the like) by maintaining the reheating temperature at about 550 to 700° C. for 80 seconds or more. However, as demonstrated, if the cooling rate exceeds 5° C./s, for example, 10° C./s 300, then the desired strength and elongation ratio weren't obtained because ferrite-bainite structure was formed.

FIG. 4 is a drawing comparing the results of a tensile-shear test of a spot welding zone (according to Example 1, after conducting the high frequency heat treatment of the heat treatment zone 120) 200 with the results of the tensile-shear test of a conventional spot welding zone, followed by vehicle assembly.

As shown in FIG. 4, the transformation rate of tensile strength was increased about 2.3 times by the high frequency heat treatment according to Example 1. Thus, energy absorbing efficiency and impact stability are improved by the locally formed softening structure formed as a result of the high frequency heat treatment of the present invention.

In the method of heat treatment according to the present invention, high frequency heat treatment of ultra-high strength parts is carried out so as to increase elongation ratio by locally forming softening structure which absorbs energy. In particular, according to the present methods, the high frequency heat treatment is performed on the heat treatment zone of the ultra-high strength parts, which has high strength and is weak on brittle fracture prior to the high frequency heat treatment method of the present invention.

Further, the type of fracture in the spot welding zone observed by external impact is plug fracture. This is in contrast with the welding zone of conventional hot-stamping-treated ultra-high strength parts, which exhibit button fracture or interfacial fracture. Thus, enough energy absorbing efficiency is obtained by the high frequency heat treatment according to the present invention, and this provides improved crash stability.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A heat treatment method of hot-stamping-treated steel parts comprising:
    a first step of heating the hot-stamping-treated steel parts until the temperature of a heat treatment zone thereof reaches an AC3 transformation point or higher;
    a second step of maintaining the temperature of the heat treatment zone until phase transformation of the heat treatment zone to austenite structure is completed; and
    a third step of cooling the heat treatment zone to provide a transformation to a ferrite-pearlite structure,
    wherein the hot-stamping-treated steel parts comprise: about 0.15 to 0.30% by weight of carbon (C), about 0.05 to 0.5% by weight of silicon (Si), about 1.0 to 2.0% by weight of manganese (Mn), about 0.0005 to 0.0040% by weight of boron (B), more than 0% and not more than about 0.003% by weight of sulfur (S), more than 0% and not more than about 0.012% by weight of phosphorus (P), a balance of iron (Fe), and inevitable impurities, the % by weight based on the total weight of the hot-stamping-treated steel parts;
    wherein the heat treatment zone is a spot welding zone;
    wherein the third step comprises maintaining the temperature at about 550 to 700° C. for about 80 seconds or more until the heat treatment zone transforms ferrite-pearlite structure;

wherein the ferrite-pearlite structure has a tensile strength of about 400 to 500 MPa and an elongation ratio of about 25% or more, wherein the third step is carried out to provide a cooling rate of about 5° C./second or less.

2. The heat treatment method according to claim 1, wherein the first step comprises heating the hot-stamping-treated steel parts until the temperature of the heat treatment zone reaches about 850 to 1000° C.

3. The heat treatment method according to claim 1, wherein the second step comprises maintaining the temperature for about 30 seconds or more until phase transformation of the heat treatment zone to austenite structure is completed when the temperature of the heat treatment zone is about 850° C.

4. The heat treatment method according to claim 1, wherein the second step comprises maintaining the temperature for about 10 seconds or more until phase transformation of the heat treatment zone to austenite structure is completed when the temperature of the heat treatment zone is about 1000° C.

* * * * *